US006568765B1

United States Patent
Augier

(10) Patent No.: US 6,568,765 B1
(45) Date of Patent: May 27, 2003

(54) COMPOSITE WHEEL HAVING A SHALLOW RIM

(75) Inventor: Pierre J. Augier, Grosse Pointe, MI (US)

(73) Assignee: Trinc Tire and Rim, Inc., Grosse Pointe, MI (US)

(*) Notice: Subject to any disclaimer, the term of this patent is extended or adjusted under 35 U.S.C. 154(b) by 0 days.

(21) Appl. No.: 10/077,335

(22) Filed: Feb. 15, 2002

(51) Int. Cl.⁷ ............................................... B60B 21/00
(52) U.S. Cl. ................................. 301/95.101; 152/339.1
(58) Field of Search ...................... 301/95.101, 95.102, 301/95.103, 95.104, 95.105, 95.106, 95.107; 152/155–156, 165, 166, 339.1, 340.1

(56) References Cited

U.S. PATENT DOCUMENTS

| | | | |
|---|---|---|---|
| 2,925,845 A | * 2/1960 | Merz | 152/339.1 |
| 3,935,892 A | 2/1976 | Arimura et al. | |
| 3,938,573 A | 2/1976 | Hallenbeck | |
| 3,945,419 A | * 3/1976 | Kosanke | 152/339.1 |
| 3,993,114 A | 11/1976 | Hinderks | |
| 4,015,652 A | 4/1977 | Harris | |
| 4,077,455 A | * 3/1978 | Curtiss et al. | 152/454 |
| 4,263,953 A | 4/1981 | Miceli | |
| 4,293,017 A | 10/1981 | Lambe | |
| 4,351,382 A | * 9/1982 | Corner et al. | 152/516 |
| 4,399,851 A | * 8/1983 | Bschorr | 152/156 |
| 4,658,876 A | 4/1987 | Augier | |
| 4,836,260 A | 6/1989 | Corner et al. | |
| 4,878,527 A | * 11/1989 | Noma | 152/379.3 |
| 5,109,905 A | 5/1992 | Lambe | |
| 5,176,764 A | * 1/1993 | Abbott et al. | 152/158 |
| 5,599,409 A | 2/1997 | Benchea | |
| 5,882,450 A | 3/1999 | Benchea | |
| RE36,686 E | 5/2000 | Benchea | |
| 6,309,026 B1 | * 10/2001 | Svedhem | 301/6.91 |
| 6,450,226 B2 | * 9/2002 | DeLacroix et al. | 152/427 |
| 6,467,518 B1 | * 10/2002 | Clouet et al. | 152/340.1 |

* cited by examiner

Primary Examiner—S. Joseph Morano
Assistant Examiner—Long Bao Nguyen
(74) Attorney, Agent, or Firm—Clark Hill PLC

(57) ABSTRACT

A wheel assembly provides a mount for a pneumatic tire having two tire beads. The wheel assembly includes a disk defining a hub receiving center and an outer peripheral edge. The wheel assembly also includes a rim that is fixedly secured to the outer peripheral edge. The rim has first and second tire seat surfaces and a well separating the first and second tire seat surfaces. First and second rim flanges are secured to the first and second tire seat surfaces, respectively, such that each of the first and second rim flanges extend out from each of the first and second tire seat surfaces at an angle less than or equal to thirty degrees. The wheel assembly also includes anti-roll off devices that interact with the tire through the flat rim flanges of the wheel assembly. A run flat device, including an inner rim bonded to an inner tube, which is, in turn, bonded to an interior carcass surface of the tire. The run flat device maintains a round shape in the tire tread even if a foreign object, such as a nail, penetrates the tire and compromises the tire pressure thereof.

16 Claims, 5 Drawing Sheets

COMPOSITE WHEEL HAVING A SHALLOW RIM

BACKGROUND ART

1. Field of the Invention

The invention relates to wheels used with motor vehicles. More specifically, the invention relates to wheels having rims that contact a larger portion of a tire.

2. Description of the Related Art

Over the last fifty years, three major innovations have significantly changed tire technology. The three changes include switching to radial ply construction, the enhanced usability of tubeless tires, and popularization of tires with lower aspect ratios than those historically used.

Tires that utilize radial ply construction have a single-ply carcass made of radially oriented cords reinforced by steel cord belts located under the tread. Tubeless tires, in which the inner tube has been eliminated, are capable of creating a seal when mounted on a wheel. And the lowering of the aspect ratio of the tire, or the ratio of sidewall height to the width of the tire, has optimized overall performance of radial tires and enhanced car styling. The result of such innovations has been a radial tire with remarkable durability, low fuel consumption, and excellent handling characteristics.

Radial tires are, however, still affected by inconveniences. For example, low aspect ratio tires feature a low sidewall height and as a result offer unsatisfactory vertical elasticity, i.e., poor road conditions are transferred directly to the motor vehicle from the tire through the wheel assembly. Current radial tires also generate road noise through unwanted vibrations that are created by the repetitive deformation of a heavy tread supported by a soft carcass. In addition, tire roll-off, that is, the unseating of tires when taking sharp turns or under severe cornering forces, is still a significant problem.

Flat tires are another major inconvenience that affects radial tires. It is estimated that 70,000 flat tire incidents per day occur in the United States of America. Common causes of flat tires include puncture by a foreign object, reckless driving, tire failure, hitting a curb, a defective air valve, an unseated tire bead, rim leak, and running over an obstacle or through a pothole. Although many run flat systems have been developed over the years, none of these systems have been substantially utilized within the global automotive industry. Thus, there is a need for a solution to the foregoing inconveniences present in radial tires.

SUMMARY OF THE INVENTION

A wheel assembly provides a mount for a pneumatic tire having two tire beads. The wheel assembly includes a disk defining a hub receiving center and an outer peripheral edge. The wheel assembly also includes a rim that is fixedly secured to the outer peripheral edge. The rim has first and second tire seat surfaces and a wheel well separating the first and second tire seat surfaces. First and second rim flanges are secured to the first and second tire seat surfaces, respectively, such that each of the first and second rim flanges extend out from each of the first and second tire seat surfaces at an angle less than or equal to thirty degrees.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
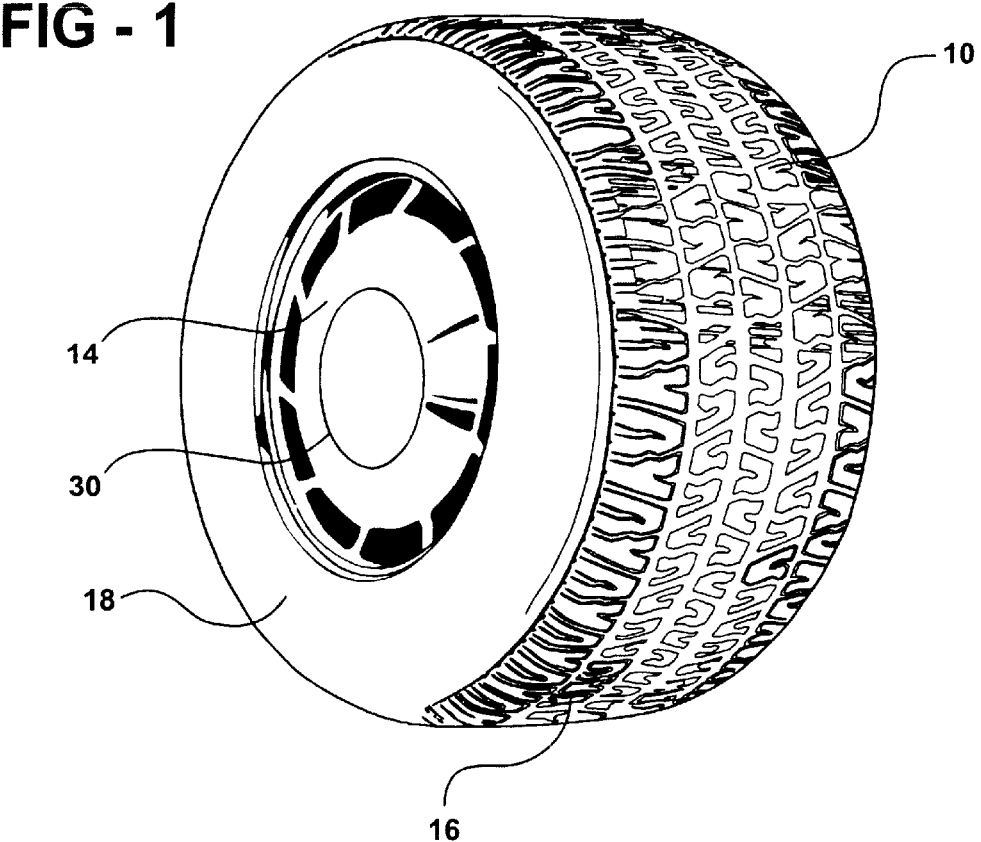
FIG. 1 is an exploded perspective view of one embodiment of the invention.
Figure 2:
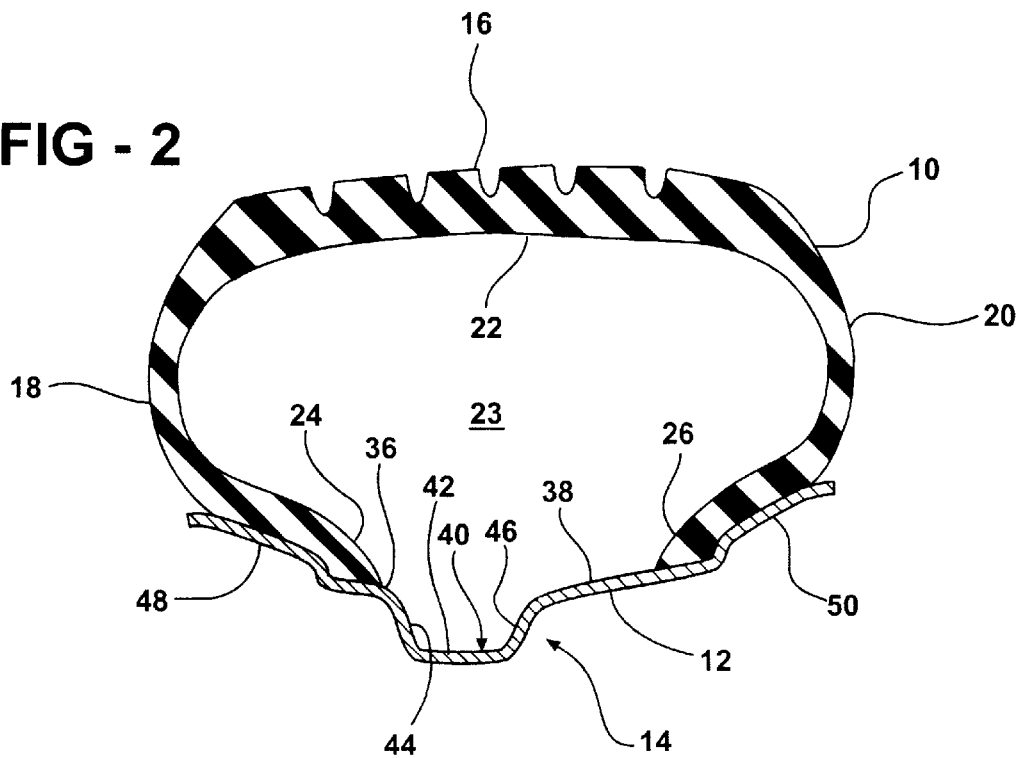
FIG. 2 is a cross-sectional side view of a tire mounted on a steel wheel incorporating one embodiment of the invention.
Figure 3:
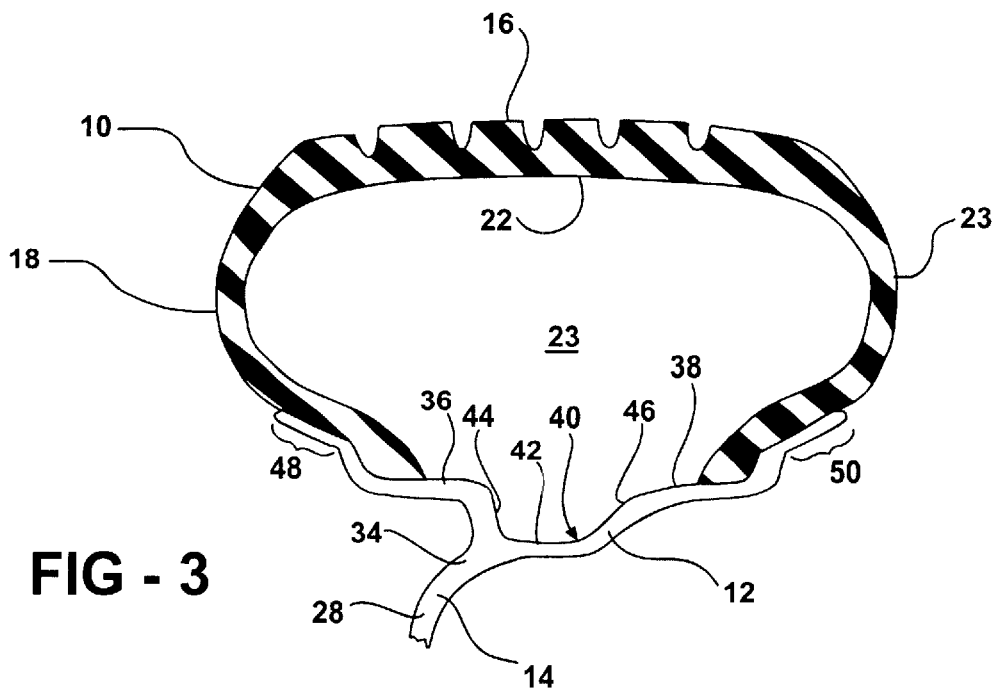
FIG. 3 is a cross-sectional side view, partially cut away, of a tire mounted on an aluminum wheel incorporating one embodiment of the invention.

Referring to FIGS. 1, 2 and 3, a tire 10 is mounted to a rim 12 of a wheel assembly, generally indicated at 14. The tire 10 includes a tread 16 and two sidewalls 18, 20. The interior of the tire 10 includes an interior carcass surface 22. The interior carcass surface 22 is the surface that is interior of the tire 10 and opposite the tread 16. More specifically, the tread 16 and the interior contour or surface 22 are opposite sides of the same wall or surface of the tire 10. Together, the interior carcass surface 22, the sidewalls 18, 20 and the rim 12 define an interior space 23 of the tire 10.

Each of the sidewalls 18, 20 includes a tire bead 24, 26. The tire beads 24, 26 extend around the entire inner diameter of the tire 10. Although not shown, the tire beads 24, 26 include a coil of wires extending therethrough. The coils cannot be stretched and, therefore, inhibit the tire 10 from becoming wider, under pressure, than the flanges of the rim 12.

The wheel assembly 14 includes a disk 28. The disk 28 defines a hub receiving center 30. The hub receiving center 30 is mounted to a hub of a motor vehicle (neither shown). The hub receiving center 30 typically includes a plurality of holes 32 that extend therethrough for receiving lug studs and/or lug nuts to secure the wheel assembly 14 to the hub of the motor vehicle.

The disk 28 extends out to an outer peripheral edge 34. As may be appreciated by those skilled in the art, the outer peripheral edge 34 is circular in design.

The rim 12 is fixedly secured to the outer peripheral edge 34. In the preferred embodiment, the rim 12 and the disk 28 may be manufactured as a unitary structure, as in the construction of an aluminum wheel (FIG. 3). Or, in the alternative embodiment, the rim 12 and disk 28 may be disparate pieces joined together via a well known welding procedure and the like, according to the metal used for the manufacture of the wheel. This is the standard steel wheel construction, as is shown in FIG. 2.

The rim 12 includes first 36 and second 38 tire seat surfaces. The tire seat surfaces 36, 38 extend generally perpendicular to the disk 28. The tire beads 24, 26 abut and engage the tire seat surfaces 36, 38 when the tire 10 is inflated on the wheel assembly 14. In the embodiments shown in the Figures the tire seat surfaces 36, 38 extend through respective planes that are approximately five degrees off with respect to the surface upon which the tire 10 is being rotated.

A wheel well, generally indicated at 40, separates the two tire seat surfaces 36, 38. The wheel well 40 is defined by a bottom surface 42 and two side surfaces 44, 46. The bottom surface 42 is the structure that is fixedly secured to the outer peripheral edge 34 of the disk 28. The wheel well 40 is designed to allow the tire beads 24, 26 to temporarily rest therein while the portion of the tire beads 24, 26 diametrically opposite may be slid over the rim 12 to be secured thereto. Therefore, the wheel well 40 is the structure in the wheel assembly 14 that allows the wheel assembly 14 to be a unitary structure having no removable parts. In other words, the wheel assembly 14 is a single structure because the wheel well 40 allows the tire 10 to be mounted thereto without having to change, alter or compromise the profile of the wheel assembly 14.

The rim 12 of the wheel assembly 14 also includes first 48 and second 50 rim flanges. The first 48 and second 50 rim flanges are fixedly secured to the first 36 and second 38 tire seat surfaces, respectively. The rim flanges 48, 50 receive a portion of the sidewalls 18, 20 disposed adjacent the tire beads 24, 26. The rim flanges 48, 50 extend out from the tire seat surfaces 36, 38 at an angle less than or equal to thirty degrees. In the preferred embodiments shown in the Figures, the angle between the rim flanges 48, 50 and the tire seat surfaces 36, 38 is within the range of twenty and thirty degrees and preferably twenty-five degrees, with respect to a horizontal plane. The angle depends, however, on the carcass line (not shown in the Figures) of the tire 10. The shallowness of the rim flanges 48, 50 improves the vertical elasticity of the tires 10 featuring low aspect ratios while enhancing the overall performance of the tire 10, even those tires 10 with the low aspect ratios.

As discussed above, the rim 12, including the tire seat surfaces 36, 38 and the rim flanges 48, 50 form a unitary structure, which creates strength in the wheel assembly 14.

Figure 4:
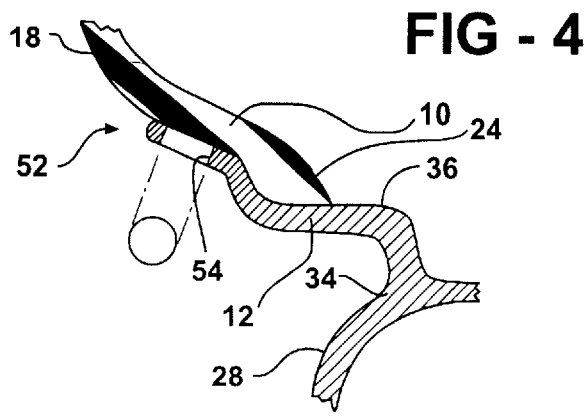
FIG. 4 is a cross-sectional side view, partially cut away, of one embodiment of the invention with a threaded hole in the rim flange.
Figure 5:
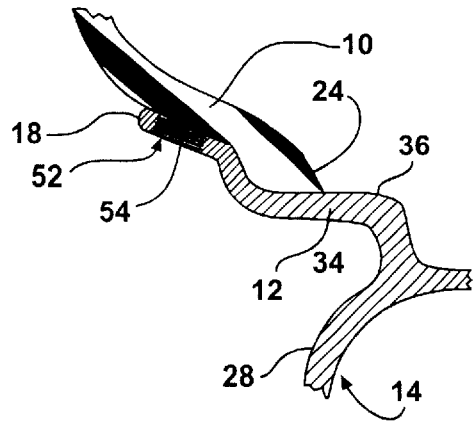
FIG. 5 is a cross-sectional side view, partially cut away, of one embodiment of the invention with the large diameter screw being inserted into the threaded hole of the rim flange.
Figure 6:
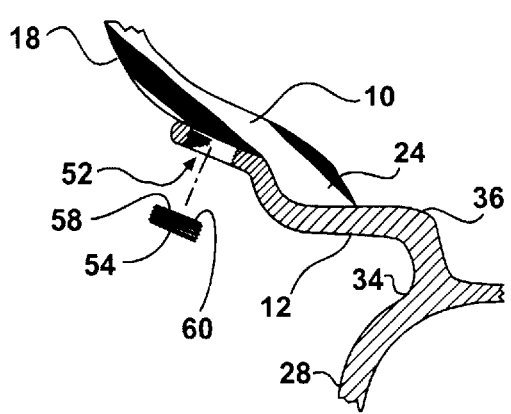
FIG. 6 is a cross-sectional side view, partially cut away, of one embodiment of the invention with a large diameter screw tightened into the hole of the rim flange.
Figure 7:
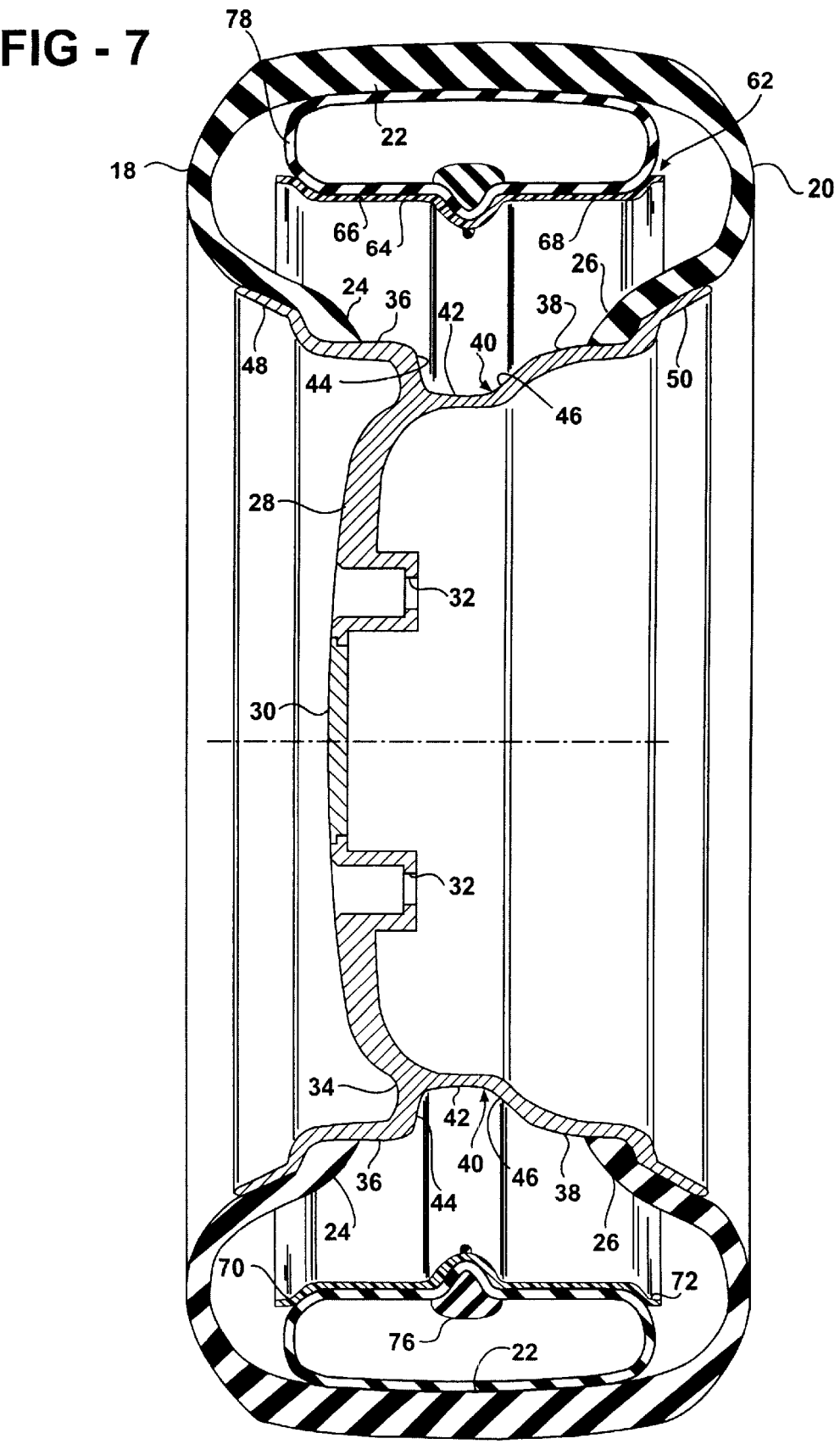
FIG. 7 is a cross-sectional side view of one embodiment of the invention incorporating a run flat device.

The wheel assembly 14 also includes an anti-roll off device, generally indicated at 52 in FIGS. 4 through 6. The wheel assembly 14 includes a plurality of anti-roll off devices 52, spaced equidistantly along the first 48 and second 50 rim flanges. The anti-roll off devices 52 prevent the tire 10 from rolling off the wheel assembly 14. This is particularly useful in a wheel assembly 14 that includes rim flanges 48, 50 that extend out from the center of the wheel assembly 14 at a relatively shallow angle.

Each of the anti-roll off devices 52 includes a hole 54 that extends completely through the rim flange 48, 50. In the preferred embodiment, the holes 54 are threaded. The threaded holes 54 receive a screw 56 therein. The screw 56 threadingly engages the threaded hole 54 and is tightened therein until it is substantially flush with the rim flange 48, 50, i.e., the outside surface of a lower sidewall 18, 20 of the tire 10, as is best shown in FIG. 6.

A bonding agent 58 is applied to an inner face 60 of the screw 56. When the screw 56 is tightened into the rim flange 48, 50, the bonding agent 58 is pressed between the inner face 60 and the sidewall 18, 20 of the tire 10. The bonding agent 58 cures and secures the screw 56 to the tire 10 and prevents the tire 10 from rolling off the wheel assembly 14. The bonding agent 58 prevents the screw 56 from rotating out of the hole 54 and the threading engagement of the screw 56 in the hole 54 prevent the tire 10 from axially moving the screw 56 out of the hole 54.

To remove the tire 10 from the wheel assembly 14, a long-armed wrench, i.e., a lug wrench may be inserted into an aperture (not shown) in the screw 56 similar to a lug nut. The sudden torque generated by the long-armed wrench will be sufficient to overcome the bonding agent 58 allowing the screw 56 to be separated from the tire sidewall 18, 20. Additional bonding agent 58 may be applied to the inner surface 60 of the screw 56 when it is to be re-secured to the wheel assembly 14.

Referring now to FIGS. 7 through 11, a run flat device is generally indicated at 62. In geometric terms, the run flat device 62 is designed to provide support to the tread 16 of the tire 10 should the tire 10 lose pressure to a non-operational level, i.e., flat. In mechanical terms, the run flat device 62 protects the sidewalls 18, 20 from collapsing. As should be appreciated by those skilled in the art, a tire 10 that is operated in a flat situation is eventually destroyed due to the stresses, strains and friction applied to the sidewalls 18, 20 that have collapsed onto each other and are pinched between the rim flanges 48, 50 and the road.

The run flat device 62 includes an inner rim 64. The inner rim 64 extends between first 66 and second 68 ends. Each of the ends 66, 68 includes a flange 70, 72. The overall width of the inner rim 64 is determined by the geometry of the tire 10.

The inner rim 64 also includes a channel 74. The channel 74 is designed to extend through a portion of the length of the inner rim 64 at a location in alignment with the wheel well 40 of the rim 12. The channel 74 performs two functions. First, the channel 74 strengthens the inner rim 64. Second, the channel 74 centers an inner tube 78, discussed subsequently, on the inner rim 64. In situations when the pressure inside the tire 10 has been reduced to a non-operational level, the channel 74 may engage the wheel well 40 and helps prevent the inner rim 64 from becoming misaligned with the wheel assembly 14. Alignment between the two rims 12, 64 helps maintain the tire 10 on the wheel assembly 14 in situations of flats and low pressure operation.

A valve system 76 is mounted within the channel 74 through the inner tube 78. The valve system 76 may be a traditional valve stem. Or, in the alternative, the valve system 76 may be a cured self-sealing material that can re-seal itself after a needle has been removed therefrom.

The run flat device 62 further includes an inner tube 78. The inner tube 78 is fabricated from the same type of material that is used to manufacture the carcass of the tire 10. The inner tube 78 is bonded to the inner rim 64 along the entire surface of the inner rim 64 extending therebetween.

The inner tube 78 is also bonded to the interior contour or surface 22 of the tire 10. By bonding the inner tube 78 to both the interior contour or surface 22 and the inner rim 64, slippage between the inner tube 78 and the tire 10 is eliminated. When the tread 16 of a rolling tire 10 comes in contact with a driving surface, large deformations appear in the structure of the tire 10. As a consequence, relative speeds of the tire components are modified.

As a consequence, slippages appear between components that are not firmly bonded. In fact, for a standard tire 10, the only actual slippage appears at the interface of the tread 16 and the driving surface. The resulting friction is directly responsible for the wear of the tread 16. Bonding the inner tube 78 to the tire 10 substantially reduces the wear of the inner tube 78, thus increasing the life thereof. In this situation, the integrity of the tire 10 is not compromised and the pressure within the tire 10 remains constant. If the nail 80 is long enough that it could potentially extend through the inner tube 78, especially after the inner tube 78 has lost pressure, the inner rim 64 prevents the nail 80 from penetrating further, thus protecting the integrity of the tire 10.

Figure 9:
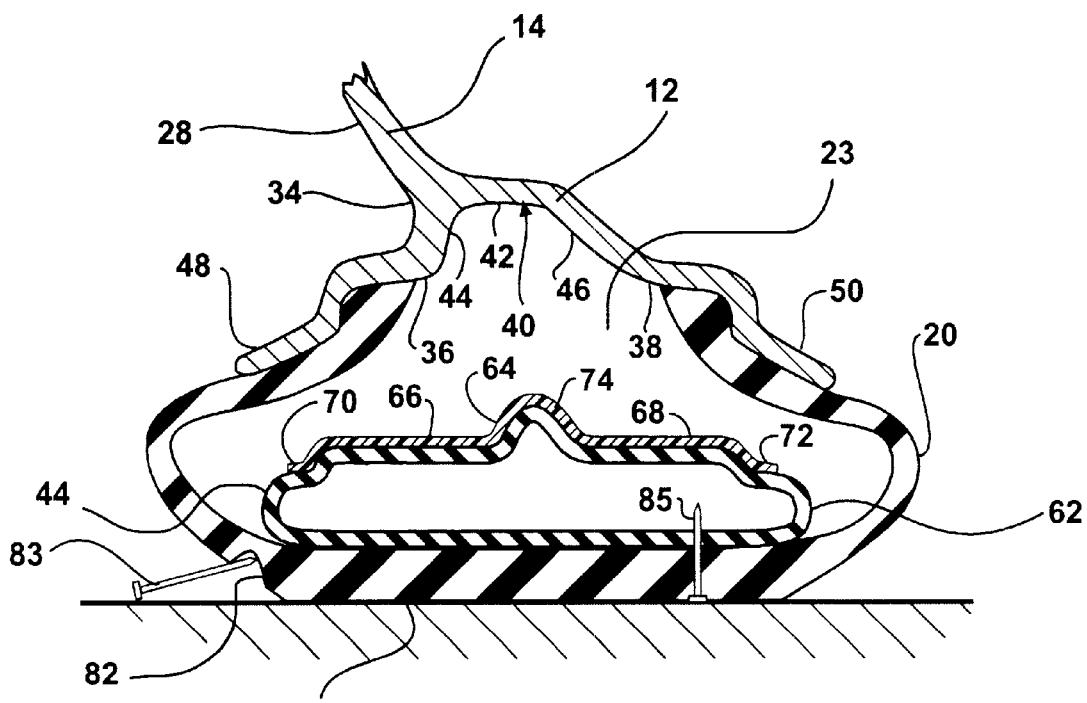

Referring to FIG. 9, a channel 82 deflects a nail 83 from the tire 10. In addition, should a second nail 85 penetrate the inner tube 78, the inner rim 64 protects the interior of the tire 10 from deflating by preventing the nail 85 from extending into the interior of the tire 10. In other words, the integrity of the tire 10 is maintained even though the tread 16 has taken in the nail 85.

Figure 10:
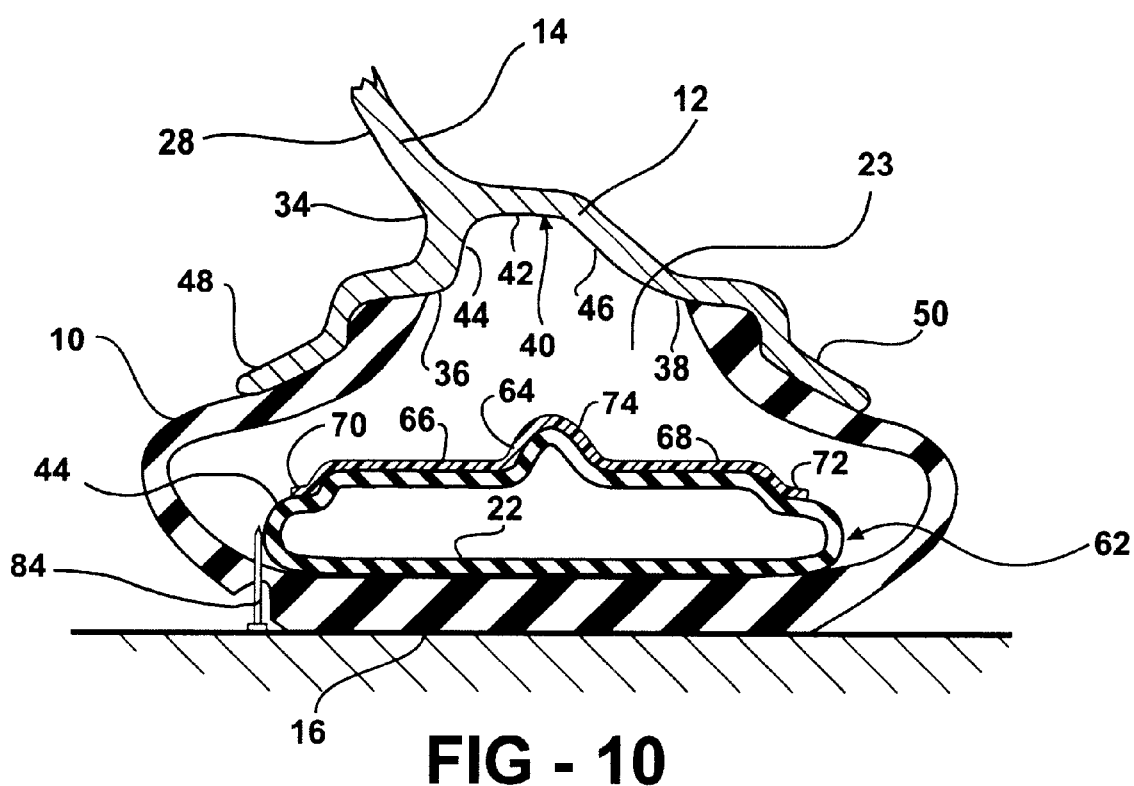

Should a nail 84, FIG. 10, penetrate the tire 10 and not the inner tube 78, the pressure in the inner tube 78 is maintained allowing the motor vehicle to continue operating until the tire 10 can be repaired.

Figure 8:
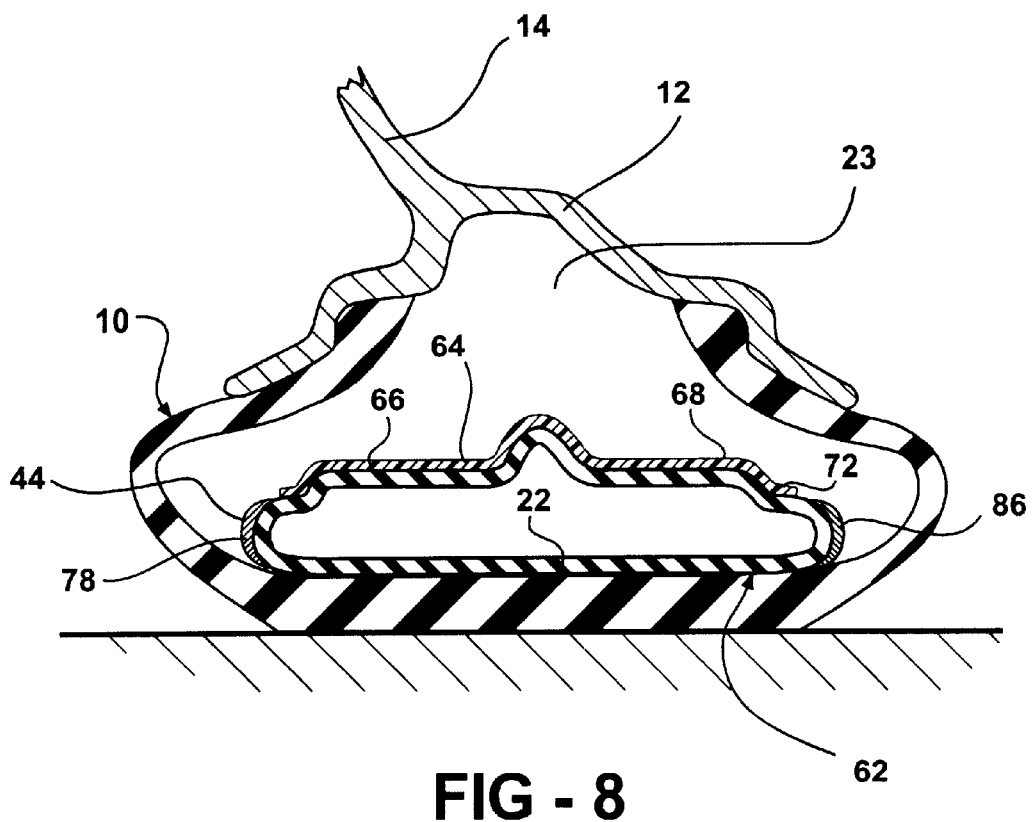
FIGS. 8 through 10 are cross-sectional side views of the invention during different types of potentially deflating situations for a tire.

In FIG. 8, an alternative embodiment of the inner tube 78 is shown. In this embodiment, the inner tube 78 includes reinforced sidewall appliques 86. The reinforced sidewall appliques 86 provide increased resistance to puncture and avoids wobbling when the inner tube 78 is deflated.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

I claim:

1. A wheel assembly for a pneumatic tire having two tire beads, said wheel assembly comprising:
    a disk defining a hub receiving center and an outer peripheral edge;
    a rim fixedly secured to said outer peripheral edge, said rim having first and second tire seat surfaces and a wheel well separating said first and second tire seat surfaces;
    first and second rim flanges fixedly secured to said first and second tire seat surfaces, respectively, such that each of said first and second rim flanges extend out from each of said first and second tire seat surfaces at an angle less than or equal to twenty-five degrees and each of said first and second tire seat surfaces extend out at an angle of approximately five degrees with respect to an axis through which said wheel assembly rotates, wherein said rim and said first and second rim flanges are a unitary structure.

2. A wheel assembly as set forth in claim 1 wherein each of said first and second rim flanges includes a plurality of anti-roll off devices for preventing the tire beads from becoming unseated from said wheel assembly.

3. A wheel assembly as set forth in claim 2, wherein said plurality of anti-roll off devices include a bonding agent to bond each of said plurality of anti-roll off devices to the tire.

4. A wheel assembly for a pneumatic tire having two tire beads and two sidewalls, said wheel assembly comprising:
    a disk defining a hub receiving center and an outer peripheral edge;
    a rim fixedly secured to said outer peripheral edge, said rim having first and second tire seat surfaces and a wheel well separating said first and second tire seat surfaces;
    first and second rim flanges fixedly secured to said first and second tire seat surfaces, respectively, such that each of said first and second rim flanges extend out from each of said first and second tire seat surfaces at an angle less than or equal to thirty degrees; and
    a plurality of anti-roll off devices extending through said first and second rim flanges for preventing the tire beads from becoming unseated from said wheel assembly.

5. A wheel assembly as set forth in claim 4 wherein each of said plurality of anti-roll off devices includes a hole extending through said rim flanges.

6. A wheel assembly as set forth in claim 5 wherein each of said plurality of anti-roll off devices includes a screw for covering said hole.

7. A wheel assembly as set forth in claim 6 wherein said screw threadingly engages said hole.

8. A wheel assembly as set forth in claim 7 wherein said anti-roll off devices includes a layer of bonding agent extending between said screw and the sidewall of the tire securing the tire to said wheel assembly.

9. A run flat assembly for use with a wheel and a pneumatic tire having a tread, two sidewalls and an interior carcass surface, said run flat assembly comprising:
    an inner tube having an outer surface bonded to the interior contour of the pneumatic tire; and
    an inner rim bonded to said inner tube opposite the interior contour, said inner rim abutting a wheel rim when pressure in the pneumatic tire is reduced to a non-operational level.

10. A run flat assembly as set forth in claim 9 wherein said inner rim extends between first and second ends.

11. A run flat assembly as set forth in claim 10 wherein said inner rim includes a peripheral flange fixedly secured to each of said first and second ends.

12. A run flat assembly as set forth in claim 11, wherein said inner rim defines a predetermined length less than a length of the wheel.

13. A run flat assembly as set forth in claim 12 wherein said inner rim includes a channel engagable with a well of the wheel when the pressure of the pneumatic tire is reduced to the non-operational level.

14. A run flat assembly as set forth in claim 13 including a valve disposed within said channel.

15. A run flat assembly as set forth in claim 14 wherein said inner tube includes secondary sidewall appliques to reinforce said inner tube.

16. A wheel assembly as set forth in claim 3, wherein each of said first and second rim flanges are substantially frusto-conical in shape.

* * * * *

UNITED STATES PATENT AND TRADEMARK OFFICE
CERTIFICATE OF CORRECTION

PATENT NO. : 6,568,765 B1  
DATED : May 27, 2003  
INVENTOR(S) : Pierre J. Augier It is certified that error appears in the above-identified patent and that said Letters Patent is hereby corrected as shown below:

Column 2,  
Line 14, delete "being inserted" and insert therefor -- tightened --.  
Line 17, delete "tightened" and insert therefor -- being inserted --.

Signed and Sealed this

Twentieth Day of January, 2004

JON W. DUDAS  
*Acting Director of the United States Patent and Trademark Office*